US010302948B2

(12) United States Patent
Ide et al.

(10) Patent No.: US 10,302,948 B2
(45) Date of Patent: May 28, 2019

(54) IMAGE DISPLAY DEVICE HAVING FIRST AND SECOND DEFLECTION UNITS

(71) Applicant: SEIKO EPSON CORPORATION, Tokyo (JP)

(72) Inventors: Mitsutaka Ide, Shiojiri (JP); Masatoshi Yonekubo, Hara-mura (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 15/514,737

(22) PCT Filed: Sep. 25, 2015

(86) PCT No.: PCT/JP2015/004880
§ 371 (c)(1),
(2) Date: Mar. 27, 2017

(87) PCT Pub. No.: WO2016/051747
PCT Pub. Date: Apr. 7, 2016

(65) Prior Publication Data
US 2017/0242252 A1    Aug. 24, 2017

(30) Foreign Application Priority Data

Oct. 2, 2014   (JP) ................................. 2014-203702

(51) Int. Cl.
*G03H 1/00*    (2006.01)
*G02B 27/01*   (2006.01)
(Continued)

(52) U.S. Cl.
CPC ..... *G02B 27/0172* (2013.01); *G02B 26/0833* (2013.01); *G02B 26/101* (2013.01);
(Continued)

(58) Field of Classification Search
CPC ...... G02B 5/32; G02B 27/01; G02B 27/0101; G02B 27/0103; G02B 2027/0123;
(Continued)

(56) References Cited

U.S. PATENT DOCUMENTS 6,081,304 A      6/2000  Kuriyama et al.
9,529,196 B1 *  12/2016  Sade .................. G02B 27/0172
(Continued)

FOREIGN PATENT DOCUMENTS

JP    H11-160650 A    6/1999
JP    2005-202221 A   7/2005
(Continued)

OTHER PUBLICATIONS

Jun. 19, 2018 Extended European Search Report issued in European Patent Application No. 15846262.2.
(Continued)

*Primary Examiner* — Arnel C Lavarias
(74) *Attorney, Agent, or Firm* — Oliff PLC

(57) ABSTRACT

A display device of the embodiment includes an image generating unit which emits a light including an image information, and a light guide optical system which generates an image from the light which is emitted from the image generating unit at a position of an exit pupil, in which the light guide optical system is provided with a first mirror (a first deflection unit) which deflects the light which is emitted from the image generating unit, and a second mirror (a second deflection unit) which further deflects the light which is deflected by the first mirror to guide the light to the position of the exit pupil and transmits a portion of external light, and in which an optical axis of the light which propagates from the first mirror toward the second mirror and an optical axis of the exit pupil form an acute angle.

18 Claims, 9 Drawing Sheets

(51) Int. Cl.
*H04N 5/64* (2006.01)
*G02B 27/14* (2006.01)
*G02B 26/08* (2006.01)
*G02B 26/10* (2006.01)
*G02B 5/32* (2006.01)

(52) U.S. Cl.
CPC .............. *G02B 27/141* (2013.01); *H04N 5/64* (2013.01); *G02B 5/32* (2013.01); *G02B 2027/011* (2013.01); *G02B 2027/0145* (2013.01); *G02B 2027/0174* (2013.01); *G02B 2027/0178* (2013.01)

(58) Field of Classification Search
CPC ............ G02B 2027/013; G02B 27/017; G02B 27/0172; G02B 2027/0174
USPC ......... 359/13, 362, 363, 364, 365, 366, 629, 359/630, 631, 632, 633
See application file for complete search history.

(56) References Cited

U.S. PATENT DOCUMENTS

| | | |
|---|---|---|
| 2009/0316115 A1 | 12/2009 | Itoh et al. |
| 2011/0051076 A1 | 3/2011 | Sugihara et al. |
| 2011/0102874 A1 | 5/2011 | Sugiyama et al. |
| 2012/0243102 A1* | 9/2012 | Takeda ................. G02B 17/086 359/630 |
| 2014/0226215 A1 | 8/2014 | Komatsu et al. |
| 2016/0103324 A1 | 4/2016 | Arakawa et al. |

FOREIGN PATENT DOCUMENTS

| | | |
|---|---|---|
| JP | 2009-258686 A | 11/2009 |
| JP | 2011-053367 A | 3/2011 |
| WO | 2010/116726 A1 | 10/2010 |
| WO | 2014/192479 A1 | 12/2014 |

OTHER PUBLICATIONS

Dec. 8, 2015 International Search Report issued in International Patent Application No. PCT/JP2015/004880.

* cited by examiner

IMAGE DISPLAY DEVICE HAVING FIRST AND SECOND DEFLECTION UNITS

TECHNICAL FIELD

The present disclosure relates to an image display device.

BACKGROUND ART

In recent years, an image display device which is used in a state of being worn on a body of a viewer such as a head mounted display is provided as a wearable information device. For example, PTL 1 which is described below discloses a display device which is provided with a first two-dimensional light scanning device, a second two-dimensional light scanning device, a semi-transmitting reflecting device, and a reflecting device. In the display device, images which are generated by each of the first two-dimensional light scanning device and the second two-dimensional light scanning device are combined by the semi-transmitting reflecting device, and the combined image is projected into the eyes of the viewer by the reflecting device. PTL 1 further describes that it is possible to configure a display device which may be looked through by using a holographic lens or the like in the reflecting device.

PTL 2 which is described below describes an image display device which is provided with an eyeglass lens, a first curved surface mirror and a second curved surface mirror which are formed on each of left and right portions of a face-side concave curved surface of the eyeglass lens, and a light scanner which outputs a scanning light beam. In the image display device, the scanning light beam which is output from the light scanner is sequentially reflected by the first curved surface mirror and the second curved surface mirror, and is projected into the eyes of the viewer.

The image display device is used embedded in general eyeglasses, and the viewer is capable of viewing in front of the viewer through the eyeglass lens.

CITATION LIST

Patent Literature

PTL 1: Japanese Unexamined Patent Application Publication No. 2005-202221
PTL 2: Japanese Unexamined Patent Application Publication No. 11-160650

SUMMARY OF INVENTION

Technical Problem

In a case in which the devices of PTLs 1 and 2 are used, the viewer is capable of visually recognizing an image of the outdoor scenes through the reflecting device or the eyeglass lens in addition to an image which is output from the display device. However, in the devices of PTL 1 and 2, there is a problem in that it is not possible to visually recognize the image of the outdoor scenes over a wide range.

For example, in the case of the display device of PTL 1, many optical systems such as the first two-dimensional light scanning device, the second two-dimensional light scanning device, and the semi-transmitting reflecting device are to be disposed on the sides of the head portion of the viewer. Therefore, the visual field of the viewer is narrowed by the optical systems. In the display device of PTL 2, the first curved surface mirror and the second curved surface mirror are disposed on the left and right of the eyeglass lens. Therefore, the visual field of the viewer is restricted by the first curved surface mirror and the second curved surface mirror.

An aspect of the embodiment is made in order to solve the problem described above, and an object thereof is to provide an image display device with which it is possible to visually recognize an image of the outdoor scenes over a wide range.

Solution to Problem

In order to achieve the object which is described above, an image display device of an aspect of the embodiment includes an image generating unit which emits a light including an image information, and a light guide optical system which generates an image from the light which is emitted from the image generating unit such that the image propagates toward a position of an exit pupil, in which the light guide optical system is provided with a first deflection unit which deflects the light which is emitted from the image generating unit, and a second deflection unit which further deflects the light which is deflected by the first deflection unit to guide the light to the position of the exit pupil and transmits a portion of external light, and in which an optical axis of the light which propagates from the first deflection unit toward the second deflection unit and an optical axis of the exit pupil form an acute angle.

In a case in which the image display device of an aspect of the embodiment is worn on the head portion by the viewer, for example, the second deflection unit which guides the light to the position of the exit pupil is positioned in front of the eyes of the viewer. The first deflection unit and the second deflection unit are in such a positional relationship that the optical axis of the light which propagates from the first deflection unit toward the second deflection unit and the optical axis of the exit pupil form an acute angle. Therefore, the first deflection unit is positioned on the rear side of the viewer in relation to the second deflection unit, that is, on the side which is closer to the ears of the viewer. The image generating unit is positioned on the rear side of the first deflection unit. Therefore, according to the image display device of an aspect of the embodiment, there is little concern of the first deflection unit and the image generating unit blocking the visual field of the viewer, and it is possible to visually recognize an image of the outdoor scenes over a wide range.

In the image display device of an aspect of the embodiment, the first deflection unit may be formed of a mirror.
According to this configuration, it is possible to realize a thin image display device.

In the image display device of an aspect of the embodiment, the mirror may be a semi-transmitting reflecting mirror which reflects a portion of incident light and transmits another portion of the incident light.

According to this configuration, it is possible to visually recognize the outdoor scenes through the first deflection unit which is formed from a semi-transmitting reflecting mirror. In other words, since the viewer is capable of visually recognizing the image of the outdoor scenes through both the second deflection unit and the first deflection unit, it is possible to further widen the visual field.

In the image display device of an aspect of the embodiment, the second deflection unit may be a holographic mirror which diffracts and deflects a portion of the incident light.

According to this configuration, it is possible to use the holographic mirror to diffract and deflect a portion of the incident light from the first deflection unit and guide the light to the eyes of the viewer.

In the image display device of an aspect of the embodiment, the second deflection unit may be formed of a semi-transmitting reflecting mirror which reflects a portion of incident light and transmits another portion of the incident light.

According to this configuration, it is possible to realize a thin image display device.

In the image display device of an aspect of the embodiment, a configuration may be adopted in which an intermediate image is generated on an optical path between the first deflection unit and the second deflection unit.

According to this configuration, the light which heads from the first deflection unit toward the second deflection unit is focused on a formation position of the intermediate image. Therefore, in a case in which the viewer wears the image display device on the head portion, the optical path between the first deflection unit and the second deflection unit does not easily interfere with the head portion. Accordingly, it is possible to reduce the size of the image display device. Furthermore, according to the configuration, even if there is hypothetically a fault in the second deflection unit, it is possible to suppress the influence on the image to a minimum.

In the image display device of an aspect of the embodiment, the second deflection unit may correct image distortion which occurs due to the light being deflected by the first deflection unit.

According to this configuration, the viewer may view an image with little distortion.

In the image display device of an aspect of the embodiment, a correcting optical system which corrects the image may be provided on an optical path between the first deflection unit and the second deflection unit.

According to this configuration, the viewer may view an image with little distortion. Since the correcting optical system is positioned on the rear side of the first deflection unit from the perspective of the viewer, there is little concern of the correcting optical system blocking the visual field of the viewer, and it is possible to visually recognize an image of the outdoor scenes over a wide range.

In the image display device of an aspect of the embodiment, the first deflection unit and the second deflection unit may be formed of an integral mirror.

According to this configuration, the number of parts is few, and it is possible to simplify the device configuration.

DESCRIPTION OF EMBODIMENTS

First Embodiment

Hereinafter, description will be given of the first embodiment using FIGS. 1 to 5.

The image display device of the first embodiment is an example of a head mounted display which a user wears on the head of the user to use.

In the following description, head mounted display will be shortened to HMD.

Figure 1:
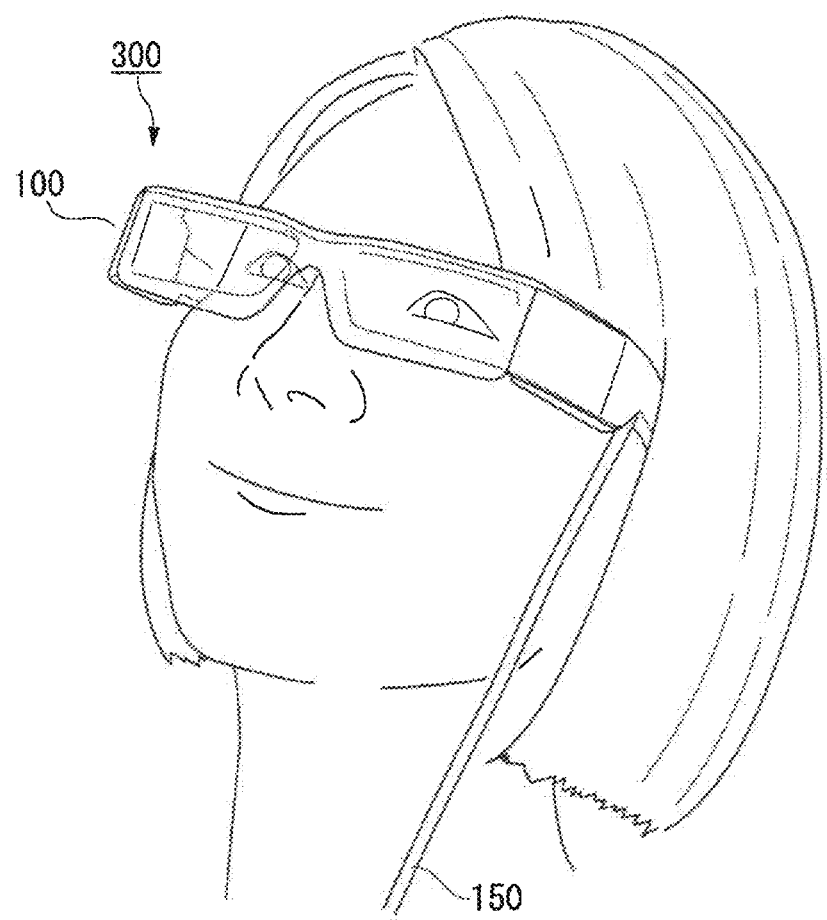
FIG. 1 is a diagram illustrating a state in which a user wears an image display device of a first embodiment.

FIG. 1 is a diagram illustrating a state in which a user wears an HMD of the first embodiment.

Figure 2:
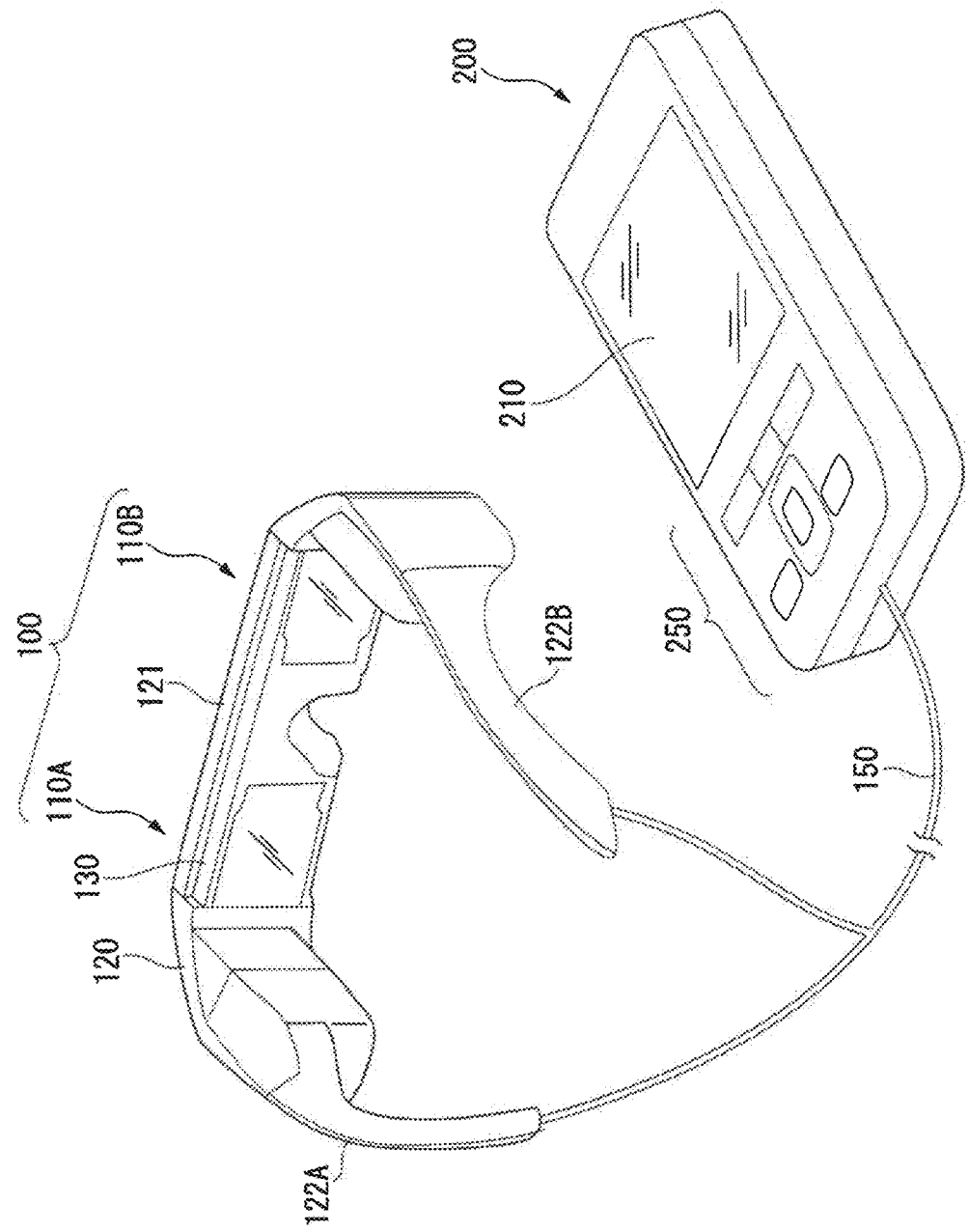
FIG. 2 is a perspective diagram of the image display device of the first embodiment.

FIG. 2 is a perspective diagram of the HMD of the first embodiment.

The dimensions may be illustrated at different scales depending on the configuration element in order to render the configuration elements easier to view in all of the following diagrams.

As illustrated in FIG. 1, an HMD 300 of the present embodiment is worn on the head portion and used by the user with the feeling of wearing eyeglasses. The HMD 300 of the present embodiment is a see-through type (transmitting type) HMD. According to the HMD 300 of the present embodiment, the user is capable of visually recognizing an image which is generated by an image display unit, and is also capable of visually recognizing an image of the outdoor scenes such as the scenery which is external to the HMD 300.

As illustrated in FIG. 2, the HMD 300 is provided with a display device 100 which has a shape which is similar to eyeglasses, and a control device (a controller) 200 which has a size of a degree a user may hold using a hand of the user. The display device 100 and the control device 200 are connected in a wired or a wireless manner to be capable of communication. In the present embodiment, each of a left eye image display unit 110A and a right eye image display unit 110B which form the display device 100, and the control device 200 are connected in a wired manner via a cable 150 to be capable of communication, and communicate image signals, control signals, and the like.

The display device 100 is provided with a main frame 120, a sub-frame 130, the left eye image display unit 110A, and the right eye image display unit 110B. The control device 200 is provided with a display unit 210, and an operation button unit 250. The display unit 210 displays various information, instructions, and the like to be provided to the user, for example. The main frame 120 is provided with a rim portion 121, and a pair of temple portions 122A and 122B for the user to wear on the ears of the user. The sub-frame 130 is a member which supports the left eye image display unit 110A and the right eye image display unit 110B.

Figure 3:
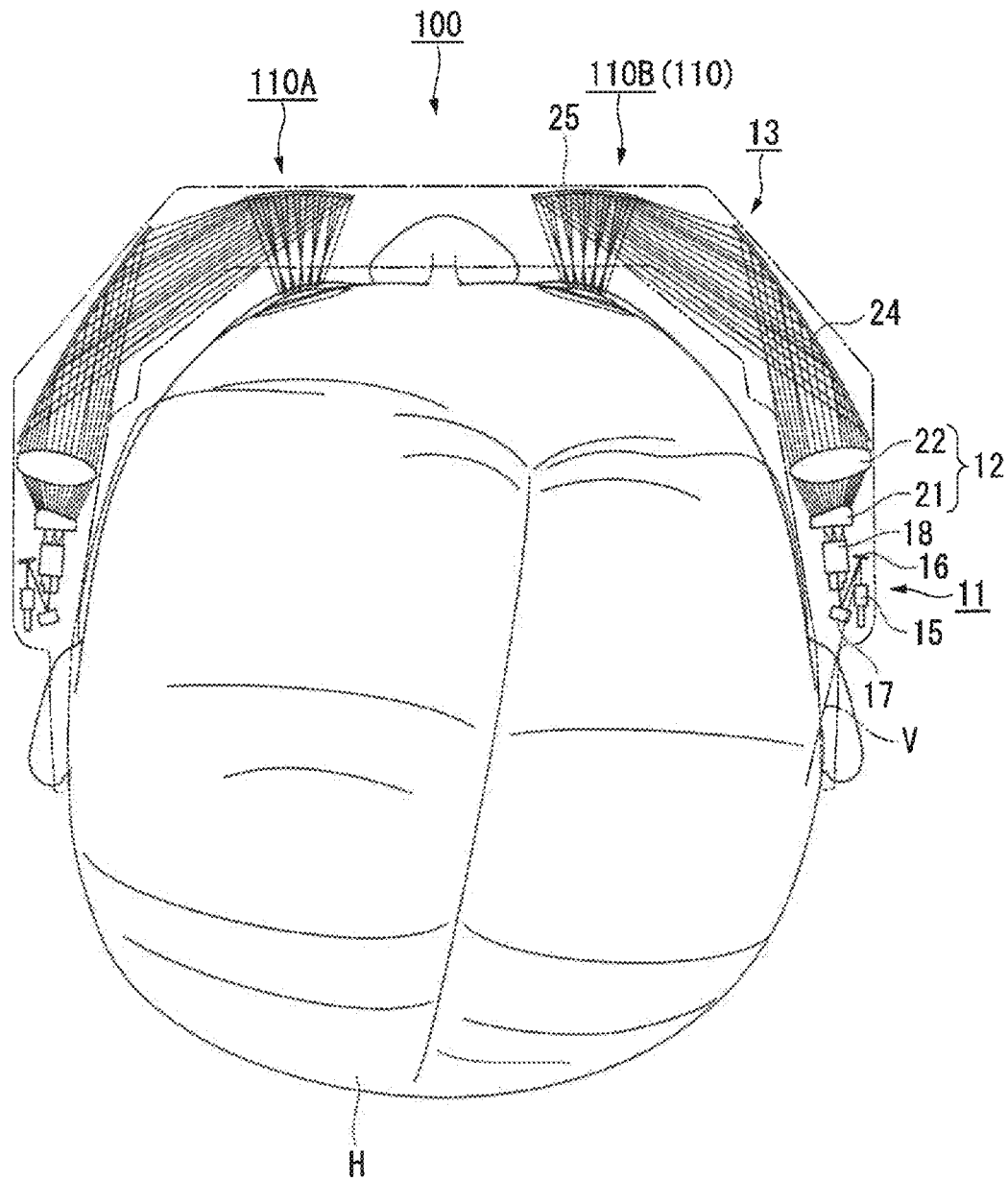
FIG. 3 is a plan view illustrating the configuration of the image display device.
Figure 4:
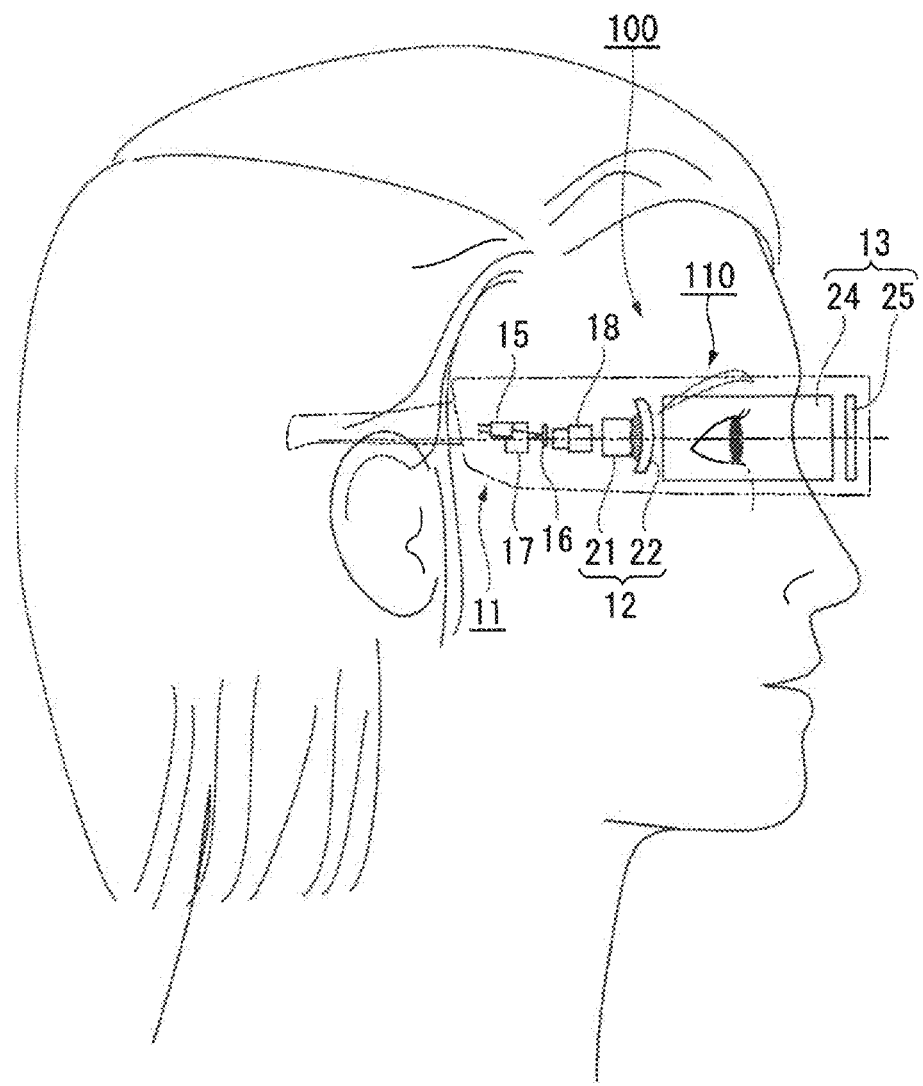
FIG. 4 is a side surface diagram illustrating the configuration of the image display device.

FIG. 3 is a plan view illustrating the configuration of the portions of the display device 100. FIG. 4 is a side surface diagram illustrating the configuration of the image display device. FIGS. 3 and 4 illustrate a state of the user wearing the display device 100 as viewed from above the head.

The right eye image display unit 110B and the left eye image display unit 110A have the same configuration, and the configuration elements inside both the image display units are disposed to be left-right symmetrical. Therefore, hereinafter, detailed description will be given of the right eye image display unit 110B simply as the image display unit 110, and description of the left eye image display unit 110A will be omitted.

As illustrated in FIGS. 3 and 4, the image display unit 110 is provided with an image generating unit 11, a correcting optical system 12, and a light guide optical system 13. The image generating unit 11 emits light which includes image information. The light guide optical system 13 generates the image which is formed by the light from the image generating unit 11 at the position of an exit pupil, that is, at the position of the pupil of the viewer. The correcting optical system 12 corrects the image which is formed by the light from the image generating unit 11. The image generating unit 11 is provided with a light source device 15, a turn-back mirror 16, a light scanning device 17, and an afocal optical system 18. The correcting optical system 12 is provided with a first correcting lens 21 and a second correcting lens 22. The light guide optical system 13 is provided with a first mirror 24 and a second mirror 25.

The first mirror 24 of the present embodiment corresponds to a first deflection unit of the claims. The second mirror 25 of the present embodiment corresponds to a second deflection unit of the claims.

For example, the light source device 15 is provided with a plurality of solid state light sources (not illustrated) including a semiconductor laser which emits red light, a semiconductor laser which emits green light, and a semiconductor laser which emits blue light. The colors of light which are emitted from the semiconductor lasers are modulated according to the image signal, the colors of light which are modulated are combined, and are emitted from the light source device 15 as image light. The optical path of the light which is emitted from the light source device 15 is turned back due to the light being reflected by the turn-back mirror 16, and the light is guided to the light scanning device 17. In the case of the present embodiment, the turn-back mirror 16 is disposed such that a normal line V of the reflecting surface side is inclined facing a direction extending to approach a head portion H of the viewer. Accordingly, the optical path is turned back from a position which is separated from the head portion H to an approaching direction.

The light scanning device 17 is provided with a MEMS mirror, for example. The light scanning device 17 causes the posture of the MEMS mirror to change according to a modulation operation of the light source device 15, and scans light two-dimensionally. In this manner, the light scanning device 17 emits light which includes image information. The light which is emitted from the light scanning device 17 is incident on the afocal optical system 18. The afocal optical system 18 includes a function of parallelizing the incident light. The light which is emitted from the light scanning device 17 is parallelized by the afocal optical system 18, and is emitted from the image generating unit 11.

The correcting optical system 12 is provided between the image generating unit 11 and the light guide optical system 13, more specifically, is provided between the afocal optical system 18 and the first mirror 24. In the present embodiment, the correcting optical system 12 is configured using two lenses of the first correcting lens 21 and the second correcting lens 22; however, the number of correcting lenses is not particularly limited. The correcting optical system 12 corrects the image which is formed by the light from the image generating unit 11; however, if correction is possible through adjustment of the curvature of the first mirror 24 and the second mirror 25, the correcting optical system 12 may not necessarily be provided. Specifically, for example, the second mirror 25 may include a function of correcting the distortion of the image which is caused by the first mirror 24.

The first mirror 24 is formed of a curved surface shaped semi-transmitting reflecting mirror which reflects a portion of the incident light and transmits another portion of the incident light. The semi-transmitting reflecting mirror has a configuration in which a surface of a transparent plate of plastic or the like, for example, is treated with a semi-transmitting reflecting film which has incidence angle dependence in which light which has an incidence angle, which is an angle between the light and a direction which is perpendicular to the surface of the transparent plate, which is greater than a predetermined angle is deflected, and light which has an incidence angle which is smaller than a predetermined angle is transmitted. The predetermined angle which is described above may be adjusted as appropriate through the design of the semi-transmitting reflecting film. The first mirror 24 is disposed in an orientation at which the light which is emitted from the image generating unit 11 is incident at a large incidence angle and is reflected. Therefore, when the viewer views the first mirror 24, the light which has a small incidence angle passes through the first mirror 24 and reaches the pupils of the viewer, and it is possible to visually recognize the image of the outdoor scenes.

Since the first mirror 24 is disposed at this orientation, the first mirror 24 becomes positioned along the face. In this manner, the first mirror 24 also has a role of ensuring that the external shape of the display device 100 goes along the face, and contributes to the reduction in the size of the display device 100 and an increase in the design properties. The first mirror 24 is formed of a curved surface mirror; however, the first mirror 24 may be formed of a planar mirror. The first mirror 24 may cause light to reflect for each different color by using a dichromatic mirror.

The second mirror 25 is formed of a curved surface shaped semi-transmitting reflecting mirror which reflects a portion of the incident light and transmits another portion of the incident light. The semi-transmitting reflecting mirror is formed of a holographic mirror which diffracts and deflects a portion of the incident light, for example. Since the semi-transmitting reflecting mirror is a holographic mirror, it is possible to cause the incidence angle and the reflection angle of the light to be different. Therefore, even if the second mirror 25 is disposed substantially at the front surface of the eyes of the viewer, it is possible guide the light which is incident at the large incidence angle from the first mirror 24 to the pupil of the viewer. An intermediate image is generated in the optical path between the first mirror 24 and the second mirror 25.

Figure 5:
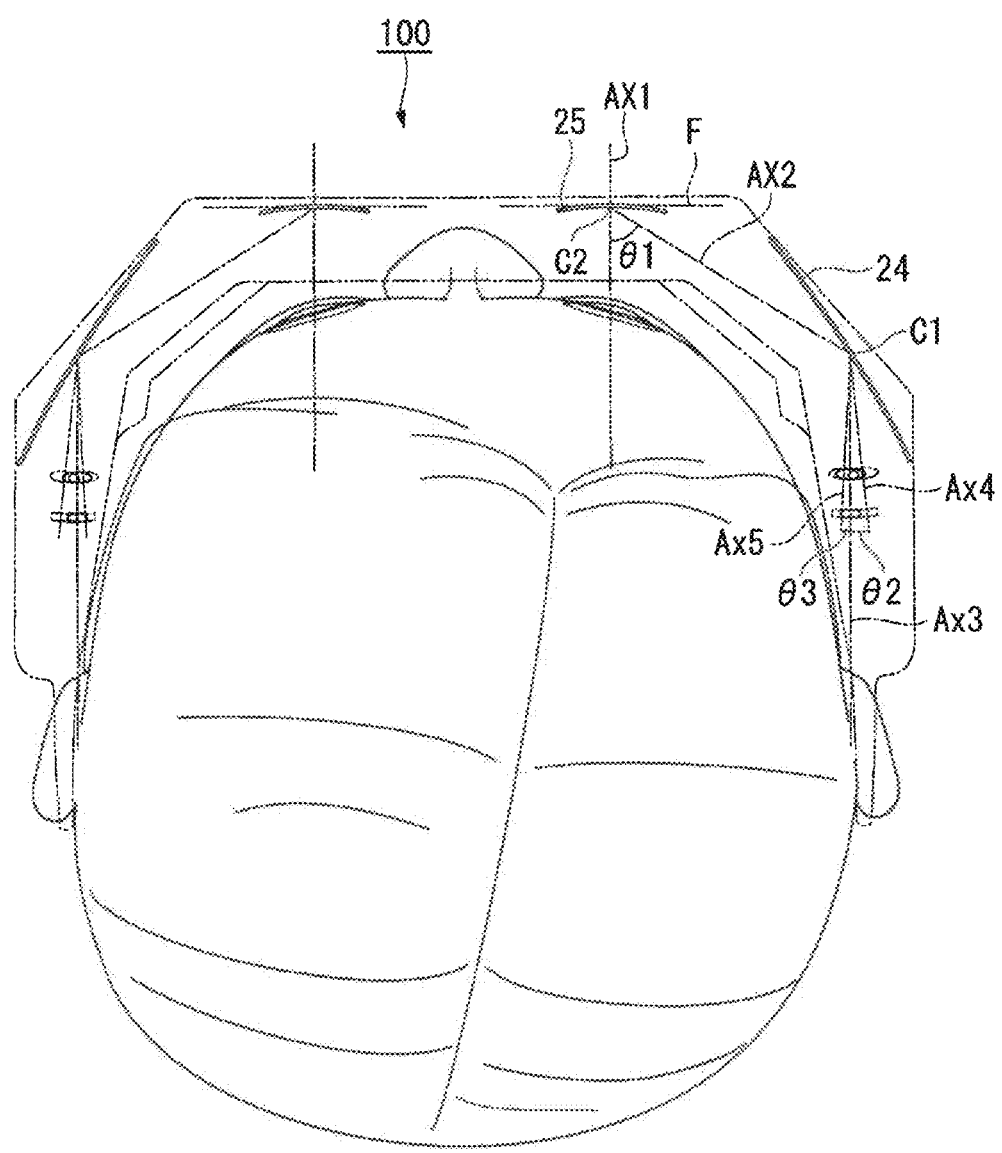
FIG. 5 is a plan view illustrating the positional relationship of portions of the image display device.

FIG. 5 is a plan view illustrating the positional relationship of portions of the display device 100.

As illustrated in FIG. 5, a tangential plane F which passes through a center C2 of the second mirror 25 is assumed. The second mirror 25 is disposed such that the angle formed by an optical axis AX1 of the exit pupil and the tangential plane F is approximately 90°. The second mirror 25 is disposed such that an angle θ1 which is formed by an optical axis AX2 of the light which heads from a center C1 of the first mirror 24 toward the center C2 of the second mirror 25 and the optical axis AX1 of the exit pupil becomes an acute angle. In the present embodiment, the angle which is formed by the optical axis AX2 of the light which heads from the center C1 of the first mirror 24 toward the center C2 of the second mirror 25 and the optical axis AX1 of the exit pupil is set to approximately 60°. Therefore, the first mirror 24 is positioned on the rear side of the viewer in relation to the second mirror 25, that is, on the side which is closer to the ears of the viewer.

The optical axis AX1 of the exit pupil of the display device 100 matches the center axis of the pupil of the viewer when the viewer wears the display device 100.

An axis AX3 which passes through the center C1 of the first mirror 24 and is parallel to the optical axis AX1 of the exit pupil is assumed. The image generating unit 11 is disposed such that an optical axis AX4 of the light which is emitted from the image generating unit 11 is inclined to the side which is further separated from the head portion than the axis AX3. In this case, it is desirable that an angle θ2 which is formed by the optical axis AX4 of the light which is emitted from the image generating unit 11 and the axis AX3 is less than or equal to 15°. Alternatively, the image generating unit 11 may be disposed such that an optical axis AX5 of the light which is emitted from the image generating unit 11 is inclined to the side which is closer to the head portion than the axis AX3. In this case, it is desirable that an angle θ3 which is formed by the optical axis AX5 of the light which is emitted from the image generating unit 11 and the axis AX3 is less than or equal to 5°.

In the display device 100 of the present embodiment, the first mirror 24 and the second mirror 25 are in a positional relationship such that the optical axis AX2 of the light heading from the first mirror 24 toward the second mirror 25 and the optical axis AX1 of the exit pupil form an acute angle (for example, 60°). In other words, the first mirror 24 is positioned on the rear side of the viewer in relation to the second mirror 25, that is, on the side which is closer to the ears of the viewer. The correcting optical system 12 and the image generating unit 11 are positioned on the rear side of the first mirror 24. Therefore, according to the display device 100 of the present embodiment, there is little concern of the first mirror 24, the correcting optical system 12, and the image generating unit 11 blocking the visual field of the viewer, and it is possible to visually recognize the image of the outdoor scenes over a wide range. The first mirror 24 is a semi-transmitting reflecting mirror, and it is possible to visually recognize the image of the outdoor scenes through the first mirror 24. Since the viewer is capable of visually recognizing the image of the outdoor scenes through the first mirror 24 which is at the edge of the visual field in addition to the second mirror 25 which is at the center of the visual field, it is possible to further widen the visual field.

The present inventors experimentally created a display device of the related art which does not include a first mirror and with which it is possible to visually recognize the outdoor scenes through only the second mirror, a display device of example 1 in which the first mirror is formed of a reflecting mirror, and a display device of example 2 in which the first mirror is formed of a semi-transmitting reflecting mirror, and compared the visual field of the viewer when wearing each of the display devices. The results are illustrated in FIG. 6.

Figure 6:
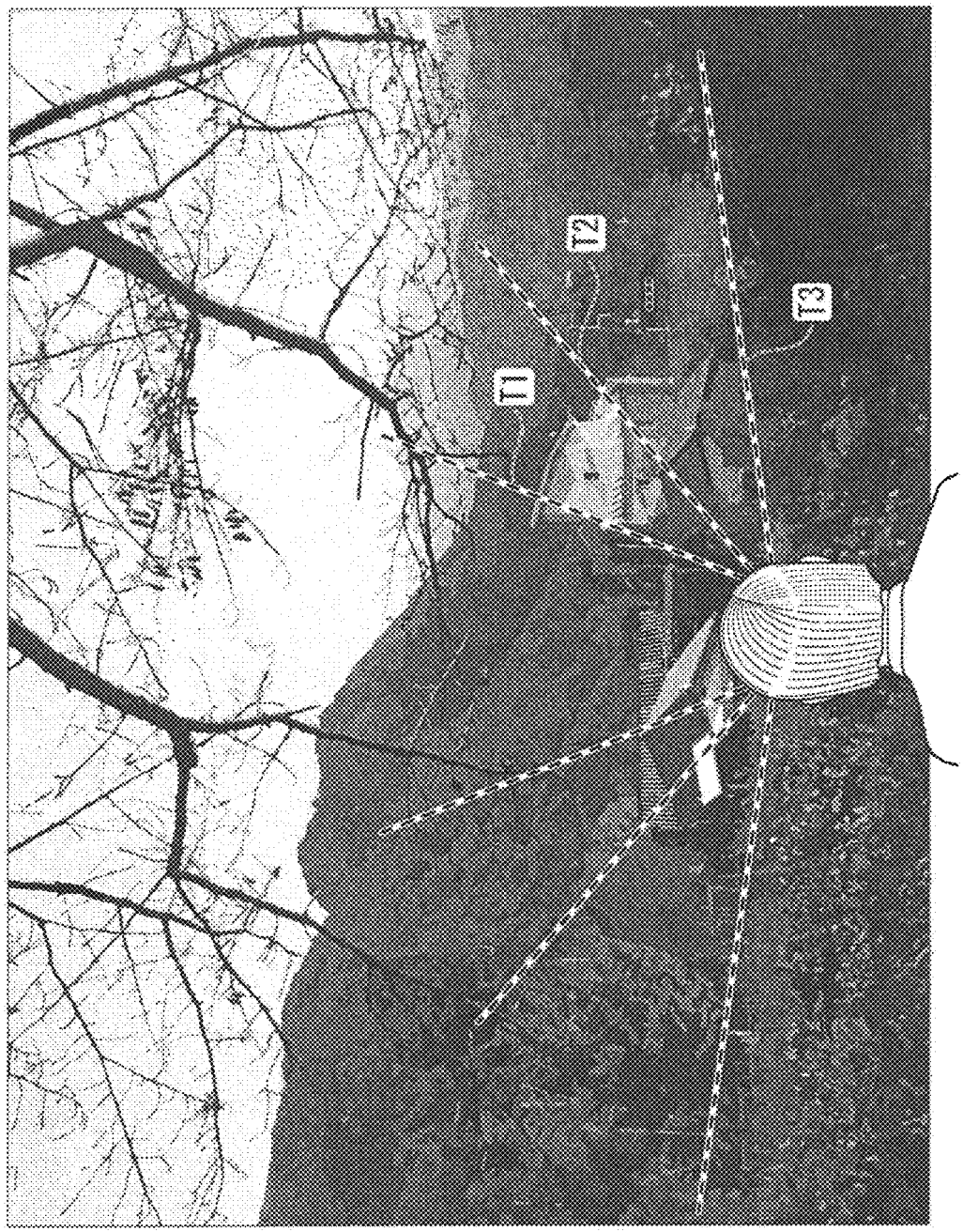
FIG. 6 is a diagram illustrating the effect of the image display device.

In FIG. 6, the visual field in the display device of the related art is indicated using symbol T1, the visual field in the display device of example 1 is indicated using symbol T2, and the visual field in the display device of example 2 is indicated using symbol T3.

As illustrated in FIG. 6, the visual field T1 in the display device of the related art has a narrow range which is centered on the front of the viewer. In comparison, the visual field T2 of the display device of example 1 goes to the edge portion of the first mirror centered on the front of the viewer, and it is possible to widen in comparison to the visual field T1.

Since it is possible to visually recognize the outdoor scenes through the first mirror in the display device of example 2, it is possible to widen the visual field T3 in comparison to the visual field T2.

In the display device 100 of the present embodiment, the first mirror 24 and the second mirror 25 occupy the front side of the head portion H of the viewer, and the correcting optical system 12 and the image generating unit 11 are positioned in the temporal region near to the ears of the viewer. A reduction in the weight of the first mirror 24 and the second mirror 25 may be sufficiently obtained, whereas the correcting optical system 12 and the image generating unit 11 include many parts and there is a limit to the weight reduction. Here, the center of gravity of the display device 100 comes to a position close to the ear due to the correcting optical system 12 and the image generating unit 11 being positioned in the temporal region near to the ears of the viewer. Therefore, an effect may be obtained in that the display device 100 is stably and easily held on the head portion even when the viewer wears the display device 100 and moves the head portion, for example.

Since the first mirror 24 is disposed to be inclined in relation to the axis AX3 which is parallel to the optical axis AX1 of the exit pupil, the first mirror 24 is positioned along the face. Since an intermediate image is generated on the optical path between the first mirror 24 and the second mirror 25, a portion in which the light is restricted (indicated using symbol F in FIG. 7) is formed on the optical path, and there is little concern of interference with the head portion H. As a result, it is possible to cause the external shape of the display device 100 to match the face, and it is possible to render the display device 100 small and slim. When an intermediate image is formed on the second mirror 25, for example, in a case in which there is a fault on the second mirror 25, the fault may greatly influence the image. To handle this, when the intermediate image is generated on the optical path between the first mirror 24 and the second mirror 25, it is possible to suppress the influence of the fault on the image to a minimum.

Second Embodiment

Hereinafter, description will be given of the second embodiment using FIG. 7.

The basic configuration of the HMD of the present embodiment is the same as that of the first embodiment, and the configuration of the second mirror differs from that of the first embodiment.

Figure 7:
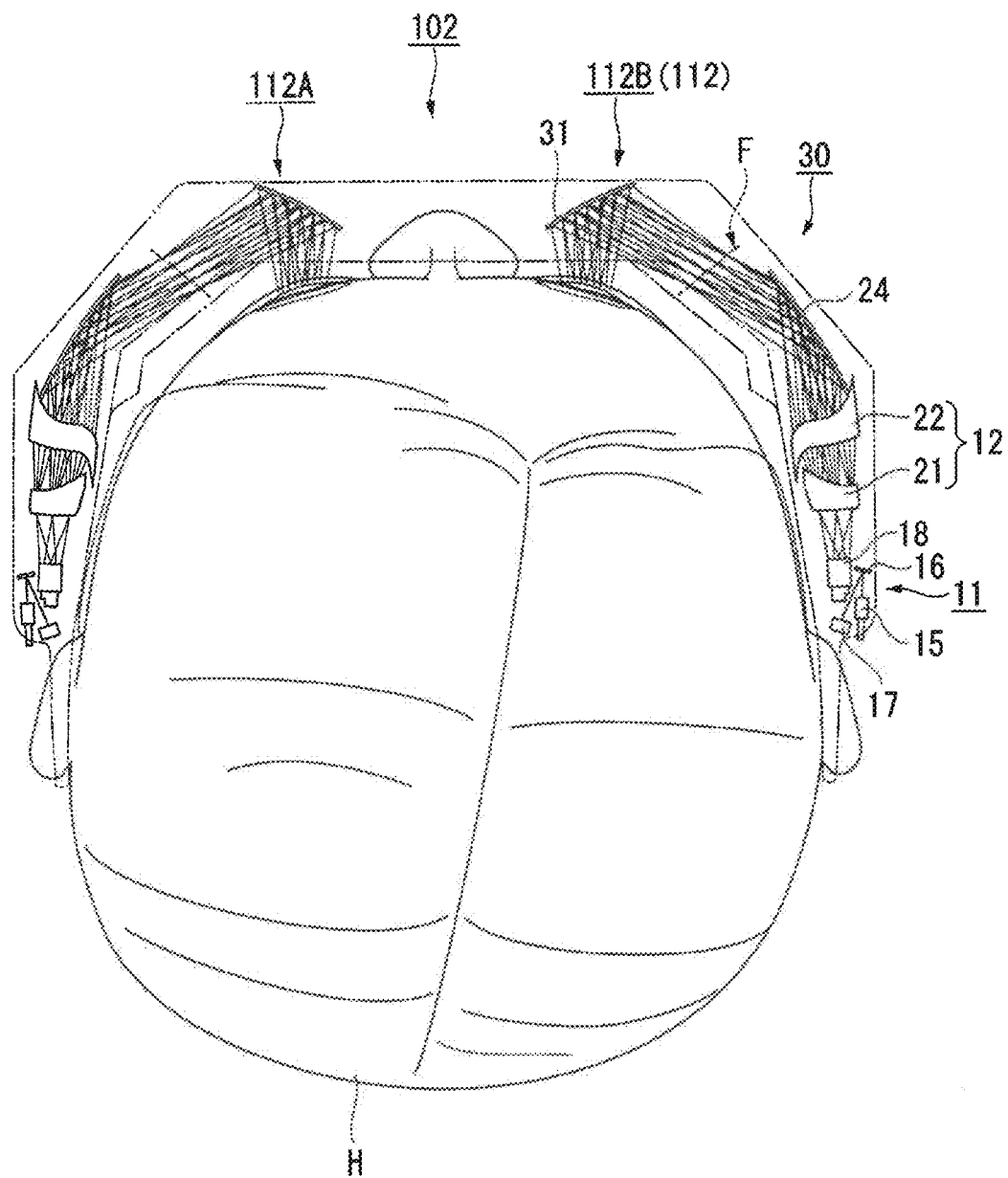
FIG. 7 is a plan view illustrating the configuration of an image display device of a second embodiment.

FIG. 7 is a plan view of the HMD of the present embodiment.

In FIG. 7, configuration elements which are shared with those of FIG. 3 which is used in the first embodiment are assigned the same symbols, and detailed description thereof will be omitted.

In the first embodiment, the second mirror 25 is formed of a holographic mirror, and light which is incident at a large incidence angle from the first mirror 24 is caused to be incident on the pupil of the viewer. In relation to this, as illustrated in FIG. 7, in a display device 102 of the present embodiment, a second mirror 31 which forms a light guide optical system 30 has a configuration in which the second mirror 31 is treated with a semi-transmitting reflecting film which has incident angle dependence in which light which has a greater incidence angle of incident light than a predetermined angle is reflected, and light which has a smaller incidence angle of incident light than a predetermined angle is transmitted. In this case, since the incidence angle and the reflection angle of the light become equal, the second mirror 31 is disposed such that the angle formed by the optical axis AX1 of the exit pupil and the tangential plane is smaller than 45° such that the angle which is formed by the optical axis AX1 of the exit pupil and the optical axis AX2 of the light which heads from the first mirror 24 toward the second mirror 25 is acute.

The other configuration is the same as that of the first embodiment.

Even in the present embodiment, it is possible to obtain the same effect as in the first embodiment, in that it is possible to realize a display device which has a wide visual field and that it is possible to realize a display device with excellent wearability and design properties. The second mirror 25 may be formed of a Fresnel lens or the like.

Third Embodiment

Hereinafter, description will be given of the third embodiment using FIG. 8.

The basic configuration of the HMD of the present embodiment is the same as that of the first embodiment, and the configurations of the first mirror and the second mirror differ from those of the first embodiment.

Figure 8:
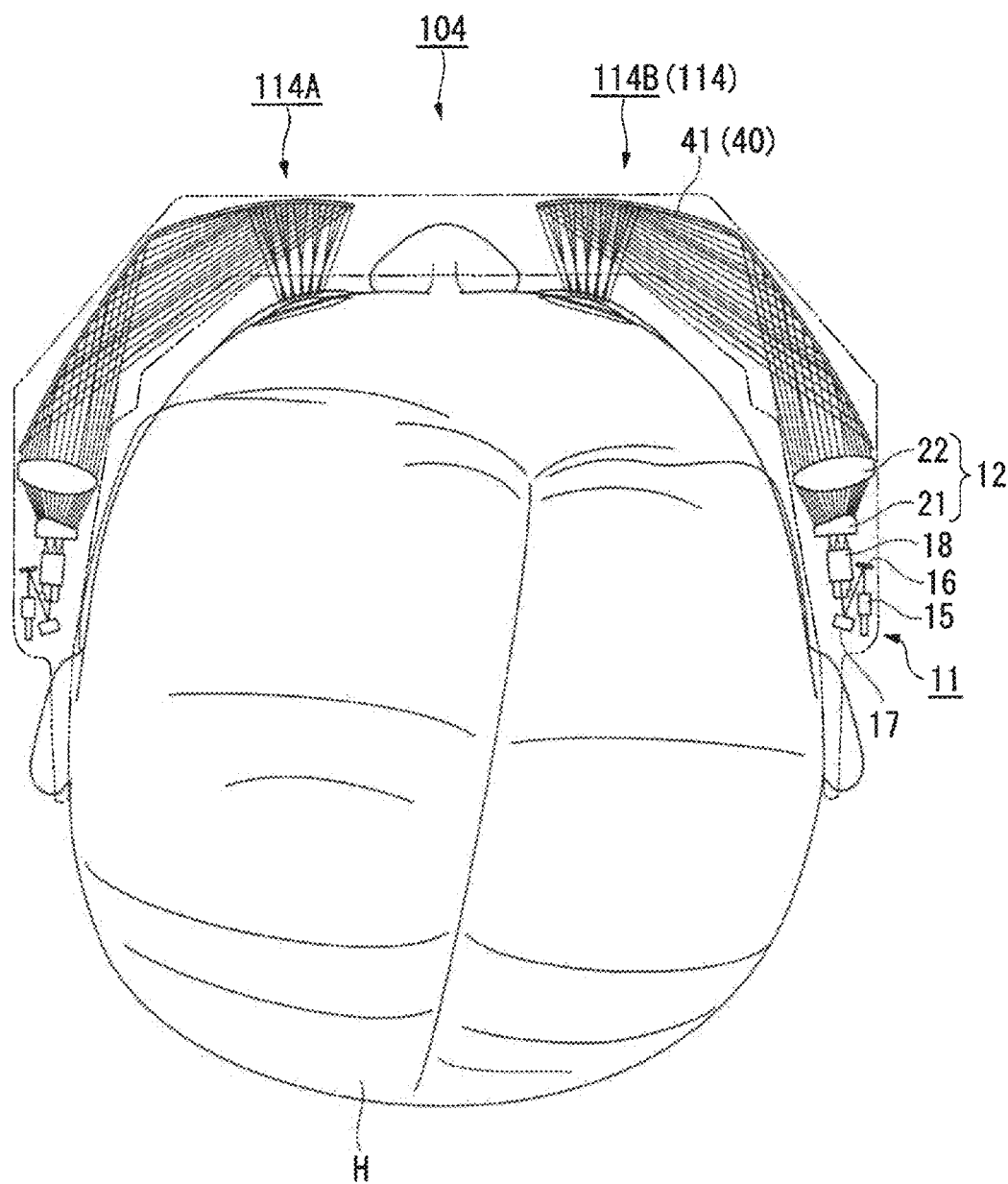
FIG. 8 is a plan view illustrating the configuration of an image display device of a third embodiment.

FIG. 8 is a plan view of the HMD of the present embodiment.

In FIG. 8, configuration elements which are shared with those of FIG. 3 which is used in the first embodiment are assigned the same symbols, and detailed description thereof will be omitted.

In the first embodiment, the first mirror 24 and the second mirror 25 are separate mirrors. In contrast, as illustrated in FIG. 8, in a display device 104 of the present embodiment, the first mirror and the second mirror which form a light guide optical system 40 are formed of an integral mirror 41. The other configuration is the same as that of the first embodiment.

Even in the present embodiment, it is possible to obtain the same effect as in the first embodiment, in that it is possible to realize an HMD which has a wide visual field and that it is possible to realize an HMD with excellent wearability and design properties. According to this configuration, the number of parts is few, and it is possible to simplify the device configuration.

Fourth Embodiment

Hereinafter, description will be given of the fourth embodiment using FIG. 9.

The basic configuration of the HMD of the present embodiment is the same as that of the first embodiment, and the configurations of the first mirror and the second mirror differ from those of the first embodiment.

Figure 9:
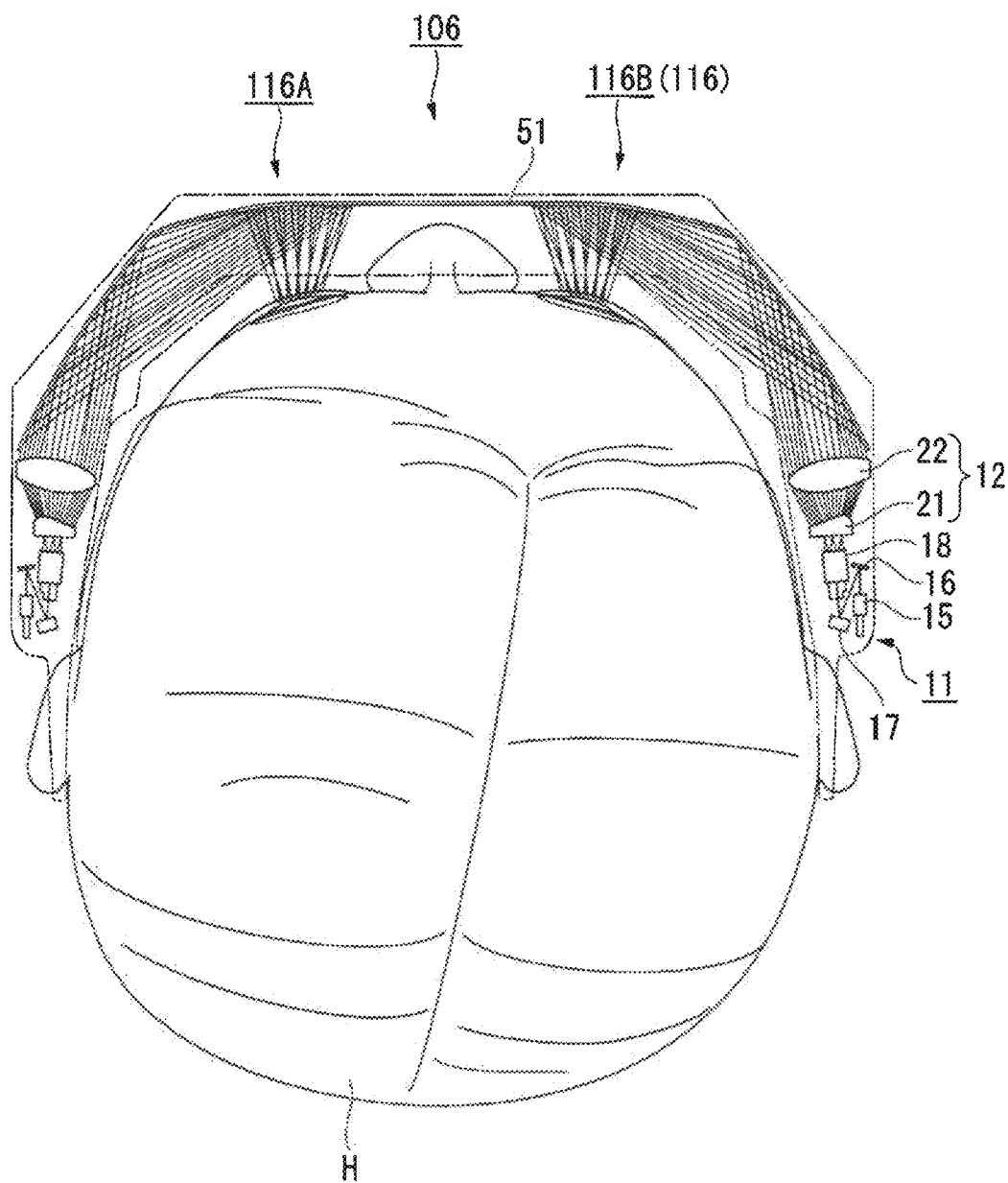
FIG. 9 is a plan view illustrating the configuration of an image display device of a fourth embodiment.

FIG. 9 is a plan view of the HMD of the present embodiment.

In FIG. 9, configuration elements which are shared with those of FIG. 3 which is used in the first embodiment are assigned the same symbols, and detailed description thereof will be omitted.

In the first embodiment, the first mirror 24 and the second mirror 25 are separate, and each of the mirrors of the right eye image display unit 110B and each of the mirrors of the left eye image display unit 110A are separate.

In contrast, as illustrated in FIG. 9, in a display device 106 of the present embodiment, the first mirror and the second mirror of a right eye image display unit 116B and the first mirror and the second mirror of a left eye image display unit 116A are all formed of an integral mirror 51.

The other configuration is the same as that of the first embodiment.

Even in the present embodiment, it is possible to obtain the same effect as in the first embodiment, in that it is possible to realize an HMD which has a wide visual field and that it is possible to realize an HMD with excellent wearability and design properties. According to this configuration, the number of parts is few, and it is possible to simplify the device configuration.

The technical scope of the invention is not limited to the embodiments described above, and it is possible to add various modifications without departing from the gist of the invention.

In the embodiment described above, an example is given of an image generating unit which is provided with a light scanning device; however, instead of this configuration, an image generating unit which is provided with a liquid crystal panel, an organic EL panel, or the like may be used. The first deflection unit and the second deflection unit are not limited to mirrors, or the Fresnel lens which is described above, and, for example, may be provided with a prism or the like. In addition, appropriate changed may be made to the specific configurations of the portions of the image display device without being limited to the embodiments described above.

REFERENCE SIGNS LIST

The entire disclosure of Japanese Patent Application No. 2014-203702, filed Oct. 2, 2014 is expressly incorporated by reference herein.

The invention claimed is:
1. An image display device comprising:
an image generating unit which emits a light including an image information; and
a light guide optical system which generates an image from the light which is emitted from the image generating unit such that the image propagates toward a position of an exit pupil, wherein
the light guide optical system is provided with a first deflection unit which deflects the light which is emitted from the image generating unit, and a second deflection unit which further deflects the light which is deflected by the first deflection unit to guide the light to the position of the exit pupil and transmits a portion of external light,
an optical axis of the light which propagates from the first deflection unit toward the second deflection unit and an optical axis of the exit pupil form an acute angle, and
an optical axis of the light which propagates from the image generating unit toward the first deflection unit and the optical axis of the light which propagates from the first deflection unit toward the second deflection unit form an obtuse angle.
2. The image display device according to claim 1, wherein the first deflection unit is formed of a mirror.
3. The image display device according to claim 2, wherein the mirror is a semi-transmitting reflecting mirror which reflects a portion of incident light and transmits another portion of the incident light.
4. The image display device according to claim 1, wherein the second deflection unit is a holographic mirror which diffracts and deflects a portion of the incident light.

5. The image display device according to claim 1, wherein the second deflection unit is a semi-transmitting reflecting mirror which reflects a portion of incident light and transmits another portion of the incident light.

6. The image display device according to claim 1, wherein an intermediate image is generated on an optical path between the first deflection unit and the second deflection unit.

7. The image display device according to claim 1, wherein the second deflection unit corrects image distortion which occurs due to the light being deflected by the first deflection unit.

8. The image display device according to claim 1, wherein a correcting optical system which corrects the image is provided on an optical path between the image generating unit and the first deflection unit.

9. The image display device according to claim 1, wherein the first deflection unit and the second deflection unit are formed of an integral mirror.

10. A head mounted display comprising:
an image generating unit which emits an image light; and
a light guide optical system which guides the image light from the image generating unit toward a position of an exit pupil, wherein
the light guide optical system is provided with a first deflection unit which deflects the image light which is emitted from the image generating unit, and a second deflection unit which further deflects the image light which is deflected by the first deflection unit to guide the image light to the position of the exit pupil and transmits a portion of external light,
a first optical axis of the image light which propagates from the first deflection unit toward the second deflection unit and a second optical axis of the image light which propagates from the second deflection unit toward the position of the exit pupil form an acute angle, and
a third optical axis of the image light which propagates from the image generating unit toward the first deflection unit and the first optical axis form an obtuse angle.

11. The head mounted display according to claim 10, wherein
the first deflection unit is formed of a mirror.

12. The head mounted display according to claim 11, wherein
the mirror is a semi-transmitting reflecting mirror which reflects a portion of incident light and transmits another portion of the incident light.

13. The head mounted display according to claim 10, wherein
the second deflection unit is a holographic mirror which diffracts and deflects a portion of the incident light.

14. The head mounted display according to claim 10, wherein
the second deflection unit is a semi-transmitting reflecting mirror which reflects a portion of incident light and transmits another portion of the incident light.

15. The head mounted display according to claim 10, wherein
an intermediate image is generated on an optical path between the first deflection unit and the second deflection unit.

16. The head mounted display according to claim 10, wherein
the second deflection unit corrects image distortion which occurs due to the image light being deflected by the first deflection unit.

17. The head mounted display according to claim 10, wherein
a correcting optical system which corrects the image light is provided on an optical path between the image generating unit and the first deflection unit.

18. The head mounted display according to claim 10, wherein
the first deflection unit and the second deflection unit are formed of an integral mirror.

* * * * *